United States Patent [19]

Soeder et al.

[11] Patent Number: 5,302,292
[45] Date of Patent: Apr. 12, 1994

[54] METHOD FOR TREATING GROUND WATER CONTAMINATION

[75] Inventors: Kenneth Soeder, Haddam; Mitchel Helfeld, Trumbull, both of Conn.

[73] Assignee: Jamestown Chemical Company, Inc., West Haven, Conn.

[21] Appl. No.: 875,253

[22] Filed: Apr. 27, 1992

Related U.S. Application Data

[63] Continuation-in-part of Ser. No. 702,923, May 20, 1991, abandoned.

[51] Int. Cl.$^5$ ................................................. C02F 1/00
[52] U.S. Cl. ...................................... 210/700; 210/698; 210/747; 210/764; 252/180; 252/181; 134/36
[58] Field of Search ............... 252/180, 181; 210/699, 210/700, 701, 750, 747, 764; 134/36, 38

[56] References Cited

U.S. PATENT DOCUMENTS

| | | | |
|---|---|---|---|
| 4,617,129 | 10/1986 | Lees | 210/700 |
| 4,640,793 | 2/1987 | Persinski et al. | 210/700 |
| 4,749,510 | 6/1988 | Nelson | 134/38 |
| 4,798,675 | 1/1989 | Lipinski et al. | 210/700 |
| 4,799,995 | 1/1989 | Crump et al. | 210/700 |
| 4,818,506 | 4/1989 | Lin et al. | 210/700 |
| 4,846,934 | 7/1989 | Carberry | 210/747 |
| 4,997,571 | 3/1991 | Roensch et al. | 210/701 |
| 5,023,011 | 6/1991 | Busch et al. | 252/180 |
| 5,160,047 | 11/1992 | McCarthy | 210/749 |

*Primary Examiner*—Prince Willis, Jr.
*Assistant Examiner*—J. Silbermann
*Attorney, Agent, or Firm*—Bachman & LaPointe

[57] ABSTRACT

The disclosure teaches a water treatment composition and method especially useful with respect to groundwater treatment upstream of an air stripper facility. The composition includes a chelating agent such as citric acid and/or ethylenediaminetetraacetic acid and a sequestration agent such as diethylenetriaminemethylenephosphoric acid.

7 Claims, No Drawings

METHOD FOR TREATING GROUND WATER CONTAMINATION

CROSS REFERENCE TO RELATED APPLICATION

This application is a Continuation-In-Part of U.S. patent application Ser. No. 702,923, filed May 20, 1991, now abandoned.

BACKGROUND OF THE INVENTION

Water contamination is a very serious problem which is increasing in magnitude, for example, with respect to groundwater contamination, municipal water supply systems, air pollution control scrubbers and cooling water systems. Specifically with respect to groundwater, roughly half of the population of the United States uses groundwater for drinking and many industries and most agricultural irrigation systems depend upon clean and safe groundwater supplies.

Contamination of the groundwater supply can come from any site at which hazardous materials have been concentrated. Common sources of contamination include garbage dumps, industrial waste dumps, septic tanks, and leaking underground storage tanks. Considerable effort is being expended to remediate this problem.

Contamination caused by volatile organic compounds (VOC's) has emerged as an area of considerable concern. These enter the groundwater most commonly from industrial spills, leaking pipelines and underground storage tanks.

A common clean-up system for remediation of VOC-contaminated groundwater involves an air stripper technique. An air stripper is a tower containing a medium through which water and air flow countercurrently and wherein the relatively high concentrations of VOC's in the water volatilize into the passing air. The VOC's removed by the stripper are carried out into the air where they dissipate and are ultimately broken down by natural causes. Alternatively, the effluent air can be cleaned before discharge.

However, a common problem facing air stripper operators is scaling caused by the natural minerals contained in the water or fouling of the stripper surfaces by other causes as biological fouling. Once fouled the system must be cleaned. This generally involves taking the stripper off-line and cleaning it manually. This naturally involves considerable labor and loss of use time and also lowers the effectiveness of the remediation program.

It is, therefore, a principal object of the present invention to provide a safe and effective water treatment composition.

It is a further object of the present invention to provide such a composition based on the use of a single mixture of components effective for treating a variety of separate problems.

It is a still further object of the present invention to provide a composition as aforesaid which is relatively inexpensive, simple and convenient to use and provides significant advantages especially with respect to groundwater treatment upstream of an air stripper facility to prevent fouling of the stripper.

Further objects and advantages of the present invention will appear hereinbelow.

SUMMARY OF THE INVENTION

In accordance with the present invention it has now been found that the foregoing objects and advantages as well as others may be readily obtained and an improved water treatment composition obtained.

The composition of the present invention consists essentially of an aqueous solution of at least 5% and generally at least 10% chelating agent, at least 3% sequestration agent and the balance essentially water. Preferably, in addition to the foregoing components, the composition includes at least 2% of crystal growth modifier or scale modifier and at least 2% of a dispersant. In addition, the composition may contain at least 0.5% of an anti-foam agent.

The water treatment composition of the present invention represents a combination of ingredients which are relatively inexpensive, convenient to use and are environmentally suitable. The composition is particularly suitable in the treatment of contaminated groundwater which involves an air stripper technique. The composition of the present invention is injected into the water stream downstream of the air stripper tower in relatively small quantities, for example, the composition of the present invention may be fed into the incoming water line of the air stripper unit on a continuous basis at a rate of at least 10 ppm (parts per million) of water and generally at a rate of from 25-100 ppm. It is a surprising finding of the present invention that the composition of the present invention effectively prevents fouling of the stripper surfaces and permits continuous use of the air stripper unit without fouling. The composition of the present invention may be effectively utilized for water treatment to prevent fouling of water treatment surfaces with respect to general water treatment systems, such as industrial treatment, agricultural treatment and common water treatment devices.

In addition to the foregoing, it has been found to be beneficial to add a microbiocide to the aqueous solution upstream of the groundwater remediation unit.

Further objects and advantages of the present invention will appear hereinbelow.

DETAILED DESCRIPTION

The composition of the present invention is particularly useful in treating water upstream of a water treatment unit in order to prevent fouling of the water treatment system by natural minerals contained in the water or by other foulants, such as iron, manganese, calcium and the like. For example, when metal containing compounds are dissolved in water, the metallic component exists as a positively charged, free-moving ion in solution. These ions react to surround themselves with reactive ions or polar molecules. In an aqueous solution containing only a simple metal ion, the reactive sites are occupied by the water molecules; however, when materials are added which react more effectively than the water, the sheath of water molecules is displaced and the metal ion acquires a new set of properties. Under circumstances of changing pH, oxygen and temperature conditions for example the soluble metal ion (especially for example iron, manganese or cobalt) will oxidize resulting in an insoluble particle that precipitates from solution and causes fouling problems.

The composition of the present invention is based on a composition of ingredients which are environmentally safe and relatively inexpensive to use and which generally mitigate the fouling problems in a downstream water treatment unit.

A key component of the composition is a chelating agent in an amount of at least 5% and generally at least 10% and generally less than 50%. Chelation is an equilibrium reaction between a metal ion and a complexing agent characterized by the formation of more than one bond between the metal ion and the molecule of the complexing agent. This results in the formation of a ring structure incorporating the metal ion. The chelating agents control metal ions by blocking the reactive sites of the metal ions and thereby preventing them from entering into their normal undesirable reactions. The chelating agents are preferably selected from the group consisting of hydroxycarboxylic acids, ethylenediaminetetraacetic acid (EDTA) and mixtures thereof. Preferred chelating agents include citric acid, tartaric acid, gluconic acid, glucoheptonic acid and EDTA.

In addition to the foregoing, a key component of the present invention is a sequestration agent or an antiprecipitant which operates to maintain the mineral component in solution, i.e., maintains the iron, manganese and calcium components in solution. At least 3% of sequestration agent is employed and generally less than 50%. Preferred sequestration agents include sequestration agents selected from the group consisting of organophosphonates, polyphosphates and diethylenetriamine-methylenephosphoric acid and mixtures thereof Representative species of sequestration agents are organophosphonates such as aminotrimethylene-phosphoric acid and 1-hydroethylidene-1,1-diphosphonic acid; and polyphosphates such as sodium tripolyphosphate, tetrasodium pyrophosphate and sodium hexametaphosphate.

In addition to the foregoing, it is preferred to utilize at least 2% of a crystal growth modifier or scale modifier, and generally less than 25% of this material. Representative scale modifiers are selected from the group consisting of maleic anhydride copolymers, polymethacrylates, polymaleic anhydrides and mixtures thereof. A particularly preferred crystal growth modifier or scale modifier is 2-phosphono-1,2,4-butanetricarboxylic acid. These materials operate to distort the surface of the crystal structure to form a more amorphous structure and tend to prevent crystal growth.

In addition to the foregoing, it is preferred to include at least 2% and generally less than 25% of a dispersant. Representative preferred dispersants include polyelectrolytes and low molecular weight carboxylic or sulfonic acid based polymers. A particularly preferred dispersant is sulfonated styrene maleic anhydride copolymer. These materials operate to modify the electrical charge of the suspended solid and act as a dispersant thereby impeding settling and fouling. These polymers control fouling by surrounding a suspended sediment and then increasing the electrical charge on the particle's surface, thereby keeping the particles repelled and suspended. The anionic polymers used in this application primarily consist of carboxylic acid and sulfonic acid derivatives. The molecular weights of these polymers must be kept low (i.e., 1,000-20,000) to prevent particle bridging and subsequent settling.

In order to combat foaming, it is preferred to utilize an anti-foam component in an amount of at least 0.5% and generally less than 5%. The anti-foam component eliminates foam problems and thereby allows the contaminated water to readily pass though the air stripping unit without causing problems with circulating pumps or treatment surfaces.

Naturally, additional components may be readily incorporated in the composition as desired.

As indicated hereinabove, it is preferred to feed the composition of the present invention directly to the incoming water line of the water treatment unit, as for example preferably an air stripping unit, on a continuous basis at a rate of at least 10 ppm and preferably 25-100 ppm by weight.

In addition to the foregoing, it has been found to be beneficial to add a microbiocide to the aqueous solution upstream of the groundwater remediation unit. While it is possible to continuously feed microbiocide into the aqueous solution, for reasons of cost it is preferred to feed the microbiocide to the aqueous solution periodically, as for example daily or 2 to 4 days a week for periods of time from 15 minutes to 4 to 5 hours. The microbiocide is generally employed in an aqueous solution in an amount of from 4 to 50% by weight. A preferred microbiocide is glutaraldehyde and a preferred concentration of glutaraldehyde is a 15% aqueous solution fed to the system 3 times a week at a rate of 160 to 460 ppm for one hour per application.

Naturally, any suitable microbiocide may be employed. Microbiocide should be operable in a pH range of 4.0 to 9.0 in order to be compatible with the groundwater. In addition, the chosen microbiocide should be compatible with the system, i.e., it should preferably breakdown into inert components, be compatible with other materials in the system and should not be harmful in the system or work in a counterproductive way. For example, the chosen microbiocide should not interfere with the operation of the other components of the system as described hereinabove. Suitable other microbiocides include the following: quaternary ammonium compounds, methylene bisthiocyanate, 2,2-dibromonitrilo-propionamide, tris(hydroxymethyl)nitromethane and 5-chloro-2methyl -4-isothiazolin-3-one/2-methyl-4-isothiazolin-3-one. Throughout the present specification, percentages are given as percentages by weight.

The present invention's advantages thereof may be illustrated in the following illustrative examples.

EXAMPLE 1

A composition of the present invention was prepared as follows:

Citric Acid: 15% by weight
EDTA: 10% by weight
2-phosphono-1,2,4 butanetricarboxylic acid: 5.0% by weight
diethylenetriamine-methylenephosphoric acid: 5.0% by weight
sulfonated styrene maleic anhydride copolymer: 8% by weight
balance water

EXAMPLE 2

The foregoing composition was tested in an air stripper unit by feeding the composition on a continuous basis at a rate of 25 ppm by weight into the incoming water line upstream of the air stripping unit. The following data represents a summary of the results based on analysis of the iron and manganese components upstream and downstream of the air stripping unit. Table 1 below shows the data without treatment and Table 2 below shows the data with treatment.

TABLE I

| Date | Analysis | Results |
| --- | --- | --- |
| Day 1 | Fe in | 17.50 ppm |
| | Fe out | 16.00 ppm |
| | Mn in | 7.06 ppm |
| | Mn out | 7.00 ppm |
| Day 8 | Fe in | 17.10 ppm |
| | Fe out | 16.50 ppm |
| | Mn in | 6.83 ppm |
| | Mn out | 6.68 ppm |
| Day 14 | Fe in | 25.00 ppm |
| | Fe out | 12.50 ppm |
| | Mn in | 7.33 ppm |
| | Mn out | 6.90 ppm |
| Day 21 | Fe in | 15.50 ppm |
| | Fe out | 10.90 ppm |
| | Mn in | 6.72 ppm |
| | Mn out | 6.55 ppm |

TABLE II

| Date | Analysis | Results |
| --- | --- | --- |
| Day 1 | Fe in | 10.28 ppm |
| | Fe out | 8.24 ppm |
| | Mn in | 5.56 ppm |
| | Mn out | 5.60 ppm |
| Day 5 | Fe in | 10.0 ppm |
| | Fe out | 10.0 ppm |
| Day 6 | Fe in | 9.80 ppm |
| | Fe out | 8.56 ppm |
| | Mn in | 6.12 ppm |
| | Mn out | 5.88 ppm |
| Day 9 | Fe in | 9.96 ppm |
| | Fe out | 6.72 ppm |
| | Mn in | 5.72 ppm |
| | Mn out | 5.60 ppm |
| Day 20 | Fe in | 9.96 ppm |
| | Fe out | 6.72 ppm |
| Day 23 | Fe in | 10.3 ppm |
| | Fe out | 11.3 ppm |
| | Mn in | 5.3 ppm |
| | Mn out | 8.8 ppm |
| Day 34 | Fe in | 10.0 ppm |
| | Fe out | 10.0 ppm |
| Day 36 | Fe in | 15.0 ppm |
| | Fe out | 15.2 ppm |
| | Mn in | 5.6 ppm |
| | Mn out | 9.5 ppm |

From the foregoing data, it can be clearly seen in Table I that iron and manganese continually precipitates on the air stripper surfaces without the treatment of the present invention. In fact, after time the tower became saturated and further water treatment was impossible. Note that in Table I without treatment the iron and manganese downstream of the stripper was continuously less than upstream clearly indicating precipitation in the air stripper.

However, Table II clearly shows that with the treatment of the present invention, the tower gradually operates without saturation and with decreasing levels of iron and manganese downstream of the air stripper unit. After a period of time with the treatment of the present invention, the previously precipitated surfaces were cleaned and precipitation ceased. In addition, after the chemical injection of the present invention was terminated, it was found that precipitation immediately resumed and the fouling process continued.

EXAMPLE 3

Several additional tests were run similar to the tests of Example 2. Comparable results were obtained in that analysis of the iron effluent showed little or no fouling or deposits on the air stripper surfaces.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for treating groundwater contamination for controlling fouling in groundwater remediation equipment by metal oxides, which comprises:
   providing an aqueous solution containing:
   from 5–50% of citric acid as a chelating agent;
   from 3–50% of a sequestration agent of diethylene-triamine-methylenephosphoric acid;
   from 2–25% of a crystal growth modifier of 2-phosphono-1,2,4-butanetricarboxylic acid; and
   from 2–25% of a dispersant of a low molecular weight sulfonated styrene maleic anhydride copolymer having a molecular weight from 1000 to 20000; and
   adding said solution into the incoming water line upstream of an air stripping unit in a concentration of at least 10 ppm by weight, thereby preventing fouling of the unit and permitting continuous use thereof.

2. Method according to claim 1 wherein said solution is added in a concentration of 25 to 100 ppm by weight.

3. Method according to claim 7 wherein said solution is continuously fed into the incoming water line.

4. Method according to claim 1 including the step of providing that said solution contains:
   from 10–15% citric acid;
   from 5–10% diethylenetriamine-methylenephosphoric acid;
   from 2–10% 2-phosphono-1,2,4-butanetricarboxylic acid; and
   from 5–15% sulfonated styrene maleic anhydride copolymer.

5. Method according to claim 1 including the step of adding a microbiocide to said aqueous solution upstream of an air stripping unit.

6. Method according to claim 5 wherein said microbiocide is employed in an aqueous solution in an amount of 4 to 50% by weight and is periodically added to said aqueous solution.

7. Method according to claim 6 wherein said microbiocide is glutaraldehyde.

* * * * *